Oct. 30, 1928.
J. A. CONLY
1,690,089
WIND BOX
Filed March 11, 1925
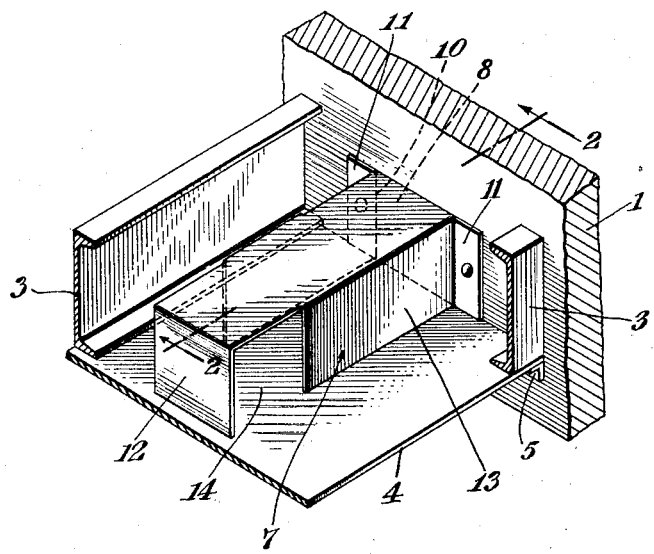
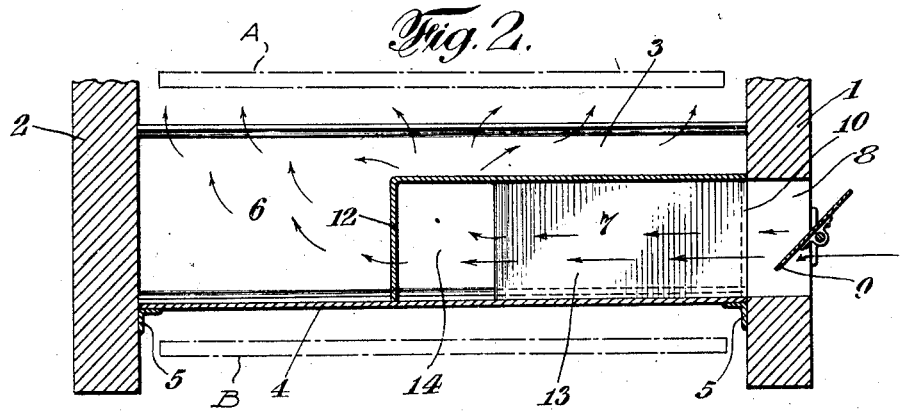

Patented Oct. 30, 1928.

1,690,089

UNITED STATES PATENT OFFICE.

JOHN A. CONLY, OF NEW YORK, N. Y., ASSIGNOR OF FORTY PER CENT TO JOSEPH A. RAUSCHER, OF HOLLIS, NEW YORK.

WIND BOX.

Application filed March 11, 1925. Serial No. 14,615.

This invention relates to improvements in wind boxes and more particularly to wind boxes or draught appliances to be used in connection with endless or continuous stoking mechanisms.

The principal object of this invention is the provision of a device of this character which is simple in construction and effective in operation in admitting a supply of air under pressure in such a manner as to result in a very even and uniform distribution of the same to the under surface of the body of coal being consumed so that combustion thereof takes place in the most efficient and effective manner.

To the accomplishment of the foregoing and such other objects as may hereinafter appear, this invention consists in the construction, combination and arrangement of parts hereinafter described and then sought to be defined in the appended claims, reference being had to the accompanying drawings forming a part hereof and showing, merely for the purpose of illustrative disclosure, the preferred embodiment of my invention, it being expressly understood that various changes may be made in practice within the scope of the claims without digressing from my inventive idea.

In the drawings—

Figure 1 represents a perspective view of a wind box constructed according to my invention installed between the side sections of a stoking and grate mechanism, parts being broken away and shown in section to facilitate the disclosure.

Figure 2 is a vertical transverse cross section, taken through the frame construction for stoking mechanism substantially on line 2—2 of Figure 1 showing the wind box constructed according to my invention installed and indicating the path of the air or draught by means of arrows.

It is to be understood that this invention is designed particularly for use in connection with the travelling or continuous grate or stoking mechanism in which the supply of air under pressure or draught is introduced between the upper and lower runs of the endless chain grate and I have illustrated the invention as installed in such a construction. It is also to be understood that this construction is not to be limited to this use except as specified in the claims.

Referring now to the drawings the numeral 1 designates the right-hand side frame member of a grate or stoker installation and the numeral 2 the left-hand side frame member of such an installation. The grate or stoker mechanism is suitably mounted between these two side frame members and is operated therebetween in the form of upper and lower runs A and B as is well understood. Between these runs are positioned the wind boxes and in the present disclosure only one of such wind boxes is illustrated, it being understood, however, that several of these wind boxes are utilized in connection with the installation, depending upon the size of the grate or stoker mechanism. These wind boxes are supplied for the full length of the upper run so that an adequate amount of air under pressure is supplied to the entire under surface of the combustible which rests upon the top of the upper run of the grate or stoker.

In this disclosure the wind box compartment is formed by providing a pair of channel beams 3 which extend transversely across the grate or stoker mechanism from side frame member 1 to side frame member 2 being supported on a bottom plate member 4 which itself is supported from the side frames 1 and 2 by means of the angle bars 5. The channel beams 3 are of sufficient width to extend from the bottom plate 4 nearly to the upper run of the grate or stoker mechanism. This construction, therefore, forms the compartment 6 closed at the bottom by plate 4, at the ends by the side frame members 1 and 2, and at its sides by the channel members 3, the compartment being open at the top permitting the air under pressure to have access to the under side of the grate or stoker mechanism.

The wind box proper 7 is mounted upon the bottom plate 4 and is connected to the air inlet opening 8 formed in one of the side frame members. The supply of air through said opening is controlled by any suitable form of damper construction 9. This wind box 7 is in the form of an oblong box, rectangular in cross section both longitudinally and transversely. It is open at one end as at 10 where it registers with the air inlet opening 8 and is secured to the side frame member 1 by means of its flanges 11. The other end 12 of the box 7 is closed and the bottom is closed, this being accomplished, in the form shown, due to the fact that the box rests upon the bottom plate 4. The box itself is of sufficient length so that the inner end 12 thereof extends somewhat beyond the center line of the grate or stoker mechanism and the side members 13 of the box are cut away or provided with openings 14 at or near the inner end thereof, these openings 14 being positioned in substantially the middle of the compartment 6 and, therefore, in the middle of the grate or stoker mechanism. The wind box 7 may be formed of sheet iron or other suitable material.

In operation the damper 9 is set according to the amount of draught desired and air admitted through the inlet 8 under pressure. It passes in through the wind box 7 and out of the openings 14 at the middle line of the grate or stoker. It diffuses or is distributed from these points by egress equally and uniformly throughout the under surface of the upper run of the grate or stoker mechanism. This results in an even distribution of air to any part of the coal bed resulting in very efficient and effective consumption of the coal and reducing to a minimum the incomplete combustion of the fuel and consequent waste. The air is supplied under suitable pressure from any proper source and the quantity admitted readily regulated by means of the damper leading to the wind box. The pressure and the distribution of the air to the under surface of the coal bed is equal and uniform.

It is to be noted that the outlet openings 14 shown open in opposite directions, one being toward the front of the stoker mechanism and the other being toward the rear thereof. I have found this to be a very simple and effective method of permitting the egress of air from the wind box but it is to be understood that the openings may be arranged in other ways so long as they result in even and uniform distribution of air at or about the medial line of the grate or stoker mechanism.

What I claim is:—

1. A construction of the character described including in combination, a pair of side frame members, a compartment formed between said side frame members closed except for its top, said side frame members constituting the ends of said compartment; a wind box positioned within said compartment and having an air inlet opening at one end opening through one of said side frame members and adapted to communicate with a source of air under pressure, said wind box being closed at its other end, top, sides and bottom but provided with a plurality of relatively large openings at substantially the middle of said compartment whereby the air is admitted and distributed evenly.

2. A construction of the character described including in combination, a pair of side frame members, a compartment formed between said side frame members closed except for its top, which is wide open, a wind box positioned within said compartment and having an air inlet opening at one end adapted to communicate with a source of air under pressure, said wind box being closed at its other end, top, sides and bottom but provided with a relatively large opening in each side at substantially the middle of the compartment whereby air is admitted and distributed uniformly.

3. In combination with an endless grate or stoker mechanism having an upper and a lower run, a compartment provided between the runs thereof and entirely closed except for its top, a wind box positioned within said compartment on the bottom thereof and secured at one end to a side wall of said compartment and having one end adapted to communicate with a source of air under pressure, said wind box being closed at its other end and also closed at its top, bottom and sides but provided with a plurality of openings at substantially the middle of said grate or stoker mechanism whereby air is admitted uniformly to the under side of the upper run of said grate or stoker mechanism.

4. In combination with an endless grate or stoker mechanism having an upper and a lower run, a compartment provided between the runs thereof and entirely closed except for its top, a wind box positioned within said compartment on the bottom thereof and secured at one end to a side wall of the compartment, the bottom of the compartment forming a closure for the bottom of the wind box, the latter having one end adapted to communicate with a source of air under pressure, said wind box being closed at its inner end, top, and sides but provided with a plurality of openings at substantially the middle of said grate or stoker mechanism whereby air is admitted uniformly to the under side of the upper run of said grate or stoker mechanism, and a damper for controlling the amount of air admitted to said wind box.

5. A construction of the character described including in combination, a pair of side frame members, a compartment formed therebetween including a bottom member and a pair of side members, said side frame members forming the ends of the compartment, this compartment being open at the top, one of said side frame members having an air inlet opening, a wind box positioned in said compartment having one end open and communicating with the air inlet opening in said side frame member and secured to such side frame member, said wind box being closed at its top, bottom, sides and end with the exception of a plurality of openings near the end opposite the air inlet end, said openings being arranged in substantially the middle of said compartment.

6. In combination with the endless chain type of grate or stoker mechanism, a wind box positioned between the two runs of said grate or stoker mechanism, said wind box having one end open and adapted to receive a suitable supply of air under pressure, the other end, top, sides and bottom of said wind box being closed except that it is provided with a plurality of openings near the other end thereof, these openings being located substantially at the middle of said grate or stoker mechanism.

In testimony that I claim the foregoing, I have hereunto set my hand this 5th day of March, 1925.

JOHN A. CONLY.